Patented Mar. 2, 1954

2,671,027

UNITED STATES PATENT OFFICE 2,671,027

AGENTS FOR PREVENTING LOSS OF GLOSS IN CANDY COATINGS

Sherwood Thomas Cross, Elsmere, Del., assignor to Atlas Powder Company, Wilmington, Del., a corporation of Delaware No Drawing. Application May 12, 1951,
Serial No. 226,108

9 Claims. (Cl. 99—134)

The present invention relates to a confectionery composition of matter. More particularly it refers to sugar-fat bars and coatings.

It is an object of the present invention to provide a sugar composition which will not lose its gloss upon storage.

It is a further object to provide an edible, hardened, flavored, sugar-fat composition suitable for casting into bars and for enrobing fruit and fondant centers which will retain its original glossy appearance.

The dulling of sugar-fat bars and sugar-fat coatings of the "bon-bon" variety upon storage is a matter of common experience. Such materials lose their gloss and acquire a "frosted" finish especially under temperature cycling conditions. This phenomenon is a source of considerable financial loss and embarrassment among members of the trade since the public associates "frost" and "dullness" with "staleness." As is pointed out above, other factors are involved than a mere passage of time. Thus, a product supplied to a retail merchant in a fresh and wholesome condition, is often found to be so "dulled" or "frosted" that its unpalatable appearance makes it unsuitable for sale.

The physical or chemical nature of the change which accompanies this phenomenon is not known. The taste and technical requirements of the industry preclude any substantial modifications of the traditional formulations. For instance, such a manufacturing process as enrobing is highly sensitive to melting point and viscosity properties. Furthermore, foreign tastes must not be introduced.

In accordance with the present invention it has been found that by the incorporation of minor amounts of certain materials to be described hereinafter within a sugar-fat composition the dulling thereof can be inhibited.

By the term "sugar-fat composition" as employed in the present specification and claims is intended a composition whose primary ingredients are fat and sugar. The fat may be of vegetable or animal origin or mixtures thereof, and may be hardened by hydrogenation. The composition may also contain milk, powdered milk, salt, spice, flavor, viscosity modifiers, artificial coloring, crushed or shredded fruit or nuts, and the like. In general the fat to sugar proportions may vary on a weight basis within the limits of from about 80:20 to about 25:75. Total fat and sugar will usually compose from about 60 to 99% of the final confectionery composition.

The stabilizing ingredient which is incorporated within the confectionery composition in accordance with the present invention comprises a combination of a long chain fatty acid partial ester of a polyhydroxylic material and a polyoxyalkylene ether of a long chain fatty acid ester of a polyhydroxylic material. The esters of the fatty acids which are particularly effective are those containing at least 12 carbon atoms in the fatty acid radical, such as those obtainable by the hydrolysis of natural fats, oils and waxes. Suitable polyhydroxylic compounds include glycerol and poly-glycerols; pentaerythritol; pentitols; hexitols and the cyclic ethers thereof; cyclitols such as inositol; oligosaccharides such as glucose, sucrose and lactose; and the glycol and lower polyglycol ethers of such polyhydroxylic compounds. Partial esters of fatty acids containing from 12 to 18 carbon atoms such as those of lauric, palmitic, stearic and oleic acid with hexitols and the cyclic ethers thereof have been found particularly effective. These partial esters may be prepared by one of several known methods; such as by direct esterification of the polyhydroxy material with the free fatty acid or by alcoholysis of naturally occurring esters with polyhydroxy material, using suitable catalyst. The polyoxyalkylene ethers of the partial esters may be prepared by heating any of the partial esters with a preformed polyalkylene glycol or with alkylene oxide in the presence of a suitable catalyst. Derivatives suitable in the present instance include those containing an average of 4 to 40 polyoxyalkylene groups per mol. The preferred derivatives are the polyoxyethylene partial esters of the higher fatty acids containing from 12 to 18 carbon atoms with hexitols and the cyclic ethers thereof, the average number of oxyethylene groups per mol being between 15 and 30. Both the partial esters and their polyalkylene ether derivatives are well known and their preparation is described in detail in the prior art.

The combination of partial esters and the polyoxyalkylene derivative of a partial ester is preferably in the ratio of 1:1. However, either component may be present to as much as 80% of the mixture. It has been found that the ratios of 40:60; 50:50 and 60:40 of partial ester to polyoxyalkylene partial ester are particularly effective. These combinations are effected by simply mixing the components with stirring at room temperature in the desired proportions. The components are either oily liquids or waxy solids. If one or both components is a solid, the solid component is melted prior to combination followed by mixing with stirring at the elevated temperature. Concentration of the inhibitor may be as high as 5%, however, a preferred range is 0.5 to 1.0% based in the weight of the confection composition.

The following example is cited to illustrate the invention. It is not intended to limit it in any manner:

EXAMPLE

A summer coconut coating type containing 30% sugar, 47% of hardened vegetable fat, 12% milk powder, and 10% of plastic coconut, and minor proportions of salt and vanilla are melted at a temperature of 120° F. and to it is added 1.0% of a mixture of sorbitan monostearate and 20[1] polyoxyethylene sorbitan monostearate in a

[1] Figure indicates average number of ethylene oxide groups per mol of ester.

1:1 ratio. Stirring is continued at the elevated temperature for one hour to insure thorough incorporation of the additive. The sample is then cooled slowly to 102° F. to provide proper temper, followed by casting into a bar. This bar and a bar prepared identically but without additive both exhibited a smooth, glossy appearance. Both bars are then stored for 72 hours under temperatures alternately of 15 and 33° C., for periods of 12 hours each. At the end of this period the treated bar is substantially unchanged in appearance. The untreated bar has taken on a frosty, sugar, dull finish.

While the example is limited to a confectionery bar, it is obvious that the concept is available for much broader applications. Thus, the material may be used as a coating for fruit or fondant coatings. Furthermore, it may be applied to any other form of edible product such as upon cakes, ice cream and the like. It may be ground, powdered or sold in the form of a paste.

Among the various inhibiting agents which may be employed are the following as expressed in the table:

Table

| | |
|---|---|
| Isosorbide monolaurate. | 4 polyoxyethylene isosorbide monomyristate. |
| Isosorbide monostearate. | 30 polyoxypropylene isosorbide monoricinoleate. |
| Sorbitan monoricinoleate. | |
| Sorbitan triricinoleate. | 6 polyoxyethylene sorbitan diricinoleate. |
| Mannitan diricinoleate. | |
| Sorbitan monolaurate. | 10 polyoxyethylene sorbitan monolaurate. |
| Sorbitan dilaurate. | |
| Sorbitan tristearate. | 6 polyoxyethylene sorbitol pentaricinoleate. |
| Sorbitan monopalmitate. | |
| Sorbide monopalmitate. | 8 polyoxypropylene sorbitol trilaurate. |
| Sorbitan monooleate. | |
| Sorbitan trioleate. | 20 polyoxyethylene sorbitan monolaurate. |
| Mannide monolaurate. | |
| Mannitan trioleate. | 20 polyoxyethylene sorbtian monopalmitate. |
| Propylene glycol monostearate. | |
| Glycerol monostearate. | 20 polyoxyethylene sorbitan monooleate. |
| Glycerol distearate. | |
| Sorbitol monostearate dioleate. | 20 polyoxyethylene sorbitan trioleate. |
| Mannitol monostearate dioleate. | 20 polyoxyethylene sorbitan tristearate. |
| Dulcitol monolaurate. | 12 polyoxyethylene mannide monoricinoleate. |
| | 40 polyoxypropylene mannitol dimyristate. |
| | 10 polyoxypropylene glycerol monomargarate. |
| | 4 polyoxyethylene glycerol distearate. |
| | 20 polyoxyethylene propylene glycol monolaurate. |
| | 12 polyoxyethylene sorbitol monolaurate distearate. |
| | 30 polyoxyethylene mannitol tristearate. |

It is understood, of course, that the various items in either column may be used in any combination with items from the other. Furthermore, the various derivatives may be manufactured from mixed acids such as are obtained by saponification of fats and oils of animal and vegetable origin.

Many modifications that do not depart from the spirit of the above disclosed invention will be apparent to those skilled in the art.

What is claimed is:

1. A sugar-fat bon-bon coating in which the weight ratio of fat to sugar lies between the inclusive limits of 80/20 and 25/75 inhibited against dulling by the incorporation of a mixture comprising a partial ester of a higher fatty acid and a polyoxyethylene derivative of a partial ester of a higher fatty acid.

2. A sugar-fat bon-bon coating as described in claim 1 wherein the partial esters are derived from fatty acids containing at least 12 carbon atoms.

3. A sugar-fat bon-bon coating as described in claim 2 wherein the polyoxyethylene derivative of the partial ester contains from 4 to 40 oxyethylene groups per mol of ester.

4. A sugar-fat bon-bon coating as described in claim 3 wherein the partial esters are sorbitan partial esters.

5. A sugar-fat bon-bon coating as described in claim 4 wherein the partial esters are polyesters of sorbitan.

6. A sugar-fat bon-bon coating as described in claim 4 wherein the partial esters are monoesters of sorbitan.

7. A sugar-fat bon-bon coating as described in claim 5 wherein the partial esters are derived from stearic acid.

8. A sugar-fat bon-bon coating as described in claim 6 wherein the partial esters are derived from stearic acid.

9. A sugar-fat bon-bon coating in which the weight ratio of fat to sugar lies between the inclusive limits of 80/20 and 25/75 containing as an inhibitor of dulling a mixture comprising sorbitan monostearate and 20 polyoxyethylene monostearate.

SHERWOOD THOMAS CROSS.

References Cited in the file of this patent

UNITED STATES PATENTS

| Number | Name | Date |
|---|---|---|
| 2,398,950 | Moore | Apr. 23, 1946 |
| 2,422,486 | Johnston | June 17, 1947 |
| 2,474,019 | Steiner et al. | June 21, 1949 |

OTHER REFERENCES

"Atlas Spans and Tweens," Atlas Powder Co., Wilmington, Del. Reprinted June 1945, pages 4, 11 and 12.